United States Patent
Shen

(10) Patent No.: US 9,680,686 B2
(45) Date of Patent: *Jun. 13, 2017

(54) MEDIA WITH PLUGGABLE CODEC METHODS

(75) Inventor: Eran Shen, Naharya (IL)

(73) Assignee: SanDisk Technologies LLC, Plano, TX (US)

( * ) Notice: Subject to any disclaimer, the term of this patent is extended or adjusted under 35 U.S.C. 154(b) by 1284 days.

This patent is subject to a terminal disclaimer.

(21) Appl. No.: 11/382,189

(22) Filed: May 8, 2006

(65) Prior Publication Data

US 2007/0260616 A1   Nov. 8, 2007

(51) Int. Cl.
| | |
|---|---|
| *H04L 29/06* | (2006.01) |
| *H04N 19/00* | (2014.01) |
| *H04N 21/434* | (2011.01) |
| *H04N 21/81* | (2011.01) |
| *H04N 21/845* | (2011.01) |
| *H04N 21/854* | (2011.01) |
| *H04L 29/08* | (2006.01) |
| *H04N 19/46* | (2014.01) |
| *H04N 21/00* | (2011.01) |

(52) U.S. Cl.
CPC .... *H04L 29/06027* (2013.01); *H04L 65/1083* (2013.01); *H04L 67/06* (2013.01); *H04N 19/00* (2013.01); *H04N 21/4348* (2013.01); *H04N 21/8193* (2013.01); *H04N 21/8455* (2013.01); *H04N 21/85406* (2013.01); *H04N 19/46* (2014.11); *H04N 21/00* (2013.01)

(58) Field of Classification Search
CPC ... H04L 65/1069; H04L 65/607; H04L 65/60; H04L 65/601; H04L 67/141

USPC ........................................................ 709/217
See application file for complete search history.

(56) References Cited

U.S. PATENT DOCUMENTS

| | | | |
|---|---|---|---|
| 4,646,266 A | 2/1987 | Ovshinsky et al. | |
| 5,539,908 A | 7/1996 | Chen et al. | 395/700 |
| 5,751,012 A | 5/1998 | Wolstenholme et al. | |
| 5,768,597 A | 6/1998 | Simm | 395/712 |
| 5,835,396 A | 11/1998 | Zhang | |
| 5,838,996 A | 11/1998 | deCarmo | 395/888 |
| 5,999,949 A | 12/1999 | Crandall | 707/532 |
| 6,014,688 A | 1/2000 | Venkatraman et al. | 709/206 |
| 6,034,882 A | 3/2000 | Johnson et al. | |
| 6,055,180 A | 4/2000 | Gudesen et al. | |

(Continued)

FOREIGN PATENT DOCUMENTS

| | | |
|---|---|---|
| TW | I233289 | 5/2005 |
| TW | I256212 | 6/2006 |

(Continued)

OTHER PUBLICATIONS

PC Mag Codec definition (internet search), http://www.pcmag.com/encyclopedia/term/39939/codec , retrieved Jul. 19, 2014.*

(Continued)

*Primary Examiner* — Tom Y Chang
(74) *Attorney, Agent, or Firm* — Brinks Gilson & Lione

(57) ABSTRACT

A container file containing a media file and a pluggable codec is sent to a receiver where the pluggable codec interfaces to a media player application, according to a predefined interface, to play the media file. A header in the container file indicates the locations of the media file and the pluggable codec.

23 Claims, 4 Drawing Sheets

(56) References Cited

U.S. PATENT DOCUMENTS

| | | | |
|---|---|---|---|
| 6,185,122 B1 | 2/2001 | Johnson et al. | |
| 6,216,152 B1* | 4/2001 | Wong et al. | 709/203 |
| 6,295,482 B1 | 9/2001 | Tognazzini | |
| 6,420,215 B1 | 7/2002 | Knall et al. | |
| 6,424,581 B1 | 7/2002 | Bosch et al. | |
| 6,438,233 B1 | 8/2002 | Yoshimune et al. | |
| 6,515,888 B2 | 2/2003 | Johnson et al. | |
| 6,545,891 B1 | 4/2003 | Tringali et al. | |
| 6,545,898 B1 | 4/2003 | Scheuerlein | |
| 6,574,145 B2 | 6/2003 | Kleveland et al. | |
| 6,618,295 B2 | 9/2003 | Scheuerlein | |
| 6,631,085 B2 | 10/2003 | Kleveland et al. | |
| 6,633,509 B2 | 10/2003 | Scheuerlein et al. | |
| 6,647,389 B1 | 11/2003 | Fitch et al. | |
| 6,651,133 B2 | 11/2003 | Moore et al. | |
| 6,658,438 B1 | 12/2003 | Moore et al. | |
| 6,707,891 B1 | 3/2004 | Guedalia | 379/88.17 |
| 6,735,546 B2 | 5/2004 | Scheuerlein | |
| 6,778,974 B2 | 8/2004 | Moore et al. | |
| 6,834,312 B2 | 12/2004 | Edwards et al. | 709/246 |
| 6,856,572 B2 | 2/2005 | Scheuerlein et al. | |
| 6,859,410 B2 | 2/2005 | Scheuerlein et al. | |
| 6,868,022 B2 | 3/2005 | Scheuerlein et al. | |
| 6,890,188 B1 | 5/2005 | Le | |
| 6,919,592 B2 | 7/2005 | Segal et al. | |
| 6,951,780 B1 | 10/2005 | Herner | |
| 6,990,464 B1 | 1/2006 | Pirillo | |
| 7,062,602 B1 | 6/2006 | Moore et al. | |
| 7,081,377 B2 | 7/2006 | Cleeves | |
| 7,106,652 B2 | 9/2006 | Scheuerlein et al. | |
| 7,212,454 B2 | 5/2007 | Kleveland et al. | |
| 7,301,944 B1 | 11/2007 | Redmond | |
| 7,478,239 B1 | 1/2009 | Rosen | |
| 8,028,173 B2 | 9/2011 | Widergren et al. | |
| 2002/0007357 A1 | 1/2002 | Wong et al. | 707/1 |
| 2002/0010759 A1 | 1/2002 | Hitson et al. | |
| 2002/0108054 A1 | 8/2002 | Moore et al. | |
| 2002/0138619 A1* | 9/2002 | Ramaley et al. | 709/226 |
| 2002/0143792 A1 | 10/2002 | Belu | 707/200 |
| 2002/0144277 A1 | 10/2002 | Friedman et al. | |
| 2003/0046274 A1 | 3/2003 | Erickson et al. | 707/3 |
| 2003/0221014 A1* | 11/2003 | Kosiba et al. | 709/231 |
| 2005/0018216 A1 | 1/2005 | Barsness et al. | |
| 2005/0018768 A1 | 1/2005 | Mabey et al. | 375/240 |
| 2005/0037647 A1 | 2/2005 | Le | |
| 2005/0058590 A1 | 3/2005 | Sen et al. | |
| 2005/0108361 A1* | 5/2005 | Scott et al. | 709/217 |
| 2005/0132209 A1 | 6/2005 | Hug et al. | |
| 2005/0172274 A1* | 8/2005 | Choi et al. | 717/138 |
| 2005/0177626 A1 | 8/2005 | Freiburg et al. | 709/219 |
| 2005/0182881 A1 | 8/2005 | Chou et al. | |
| 2005/0234731 A1* | 10/2005 | Sirivara et al. | 704/500 |
| 2005/0269553 A1 | 12/2005 | Sen et al. | |
| 2006/0020824 A1 | 1/2006 | Matthews et al. | 713/193 |
| 2006/0171037 A1 | 8/2006 | Seo et al. | 359/630 |
| 2006/0239450 A1 | 10/2006 | Holtzman et al. | 380/28 |
| 2006/0242067 A1 | 10/2006 | Jogand-Coulomb et al. | 705/50 |
| 2006/0242068 A1 | 10/2006 | Jogand-Coulomb et al. | |
| 2006/0242151 A1 | 10/2006 | Jogand-Coulomb et al. | 707/9 |
| 2006/0242429 A1 | 10/2006 | Holtzman et al. | |
| 2007/0016703 A1 | 1/2007 | Bozionek et al. | |
| 2007/0043667 A1 | 2/2007 | Qawami et al. | |
| 2007/0056042 A1 | 3/2007 | Qawami et al. | 726/26 |
| 2007/0061597 A1 | 3/2007 | Holtzman et al. | 726/34 |
| 2007/0061862 A1* | 3/2007 | Berger et al. | 725/139 |
| 2007/0061897 A1 | 3/2007 | Holtzman et al. | 713/193 |
| 2007/0090425 A1 | 4/2007 | Kumar et al. | |
| 2007/0114508 A1 | 5/2007 | Herner et al. | |
| 2007/0145135 A1 | 6/2007 | Jogand-Coulomb et al. | 235/451 |
| 2007/0183493 A1* | 8/2007 | Kimpe | 375/240.1 |
| 2007/0188183 A1 | 8/2007 | Holtzman et al. | 324/758 |
| 2007/0260615 A1 | 11/2007 | Shen et al. | |
| 2007/0260616 A1 | 11/2007 | Shen et al. | |
| 2007/0267474 A1 | 11/2007 | Shen et al. | |
| 2007/0282747 A1 | 12/2007 | Shen et al. | |
| 2008/0010450 A1 | 1/2008 | Holtzman et al. | |

FOREIGN PATENT DOCUMENTS

| | | |
|---|---|---|
| WO | WO 01/14981 A1 | 3/2001 |
| WO | WO 03/023676 A1 | 3/2003 |

OTHER PUBLICATIONS

PC Mag Executable Code definition (internet search), http://www.pcmag.com/encyclopedia/term/42842/executable-code retrieved Jul. 20, 2014.*

Wikipedia Codec definition (internet search), http://en.wikipedia.org/wiki/Codec, retrieved Jul. 19, 2014.*

Webopedia Codec defintion (internet search), http://www.webopedia.com/TERM/C/codec.html, retrieved Jul. 19, 2014.*

Merriam-Webster Codec definition (internet search), http://www.merriam-webster.com/dictionary/codec,, retrieved Jul. 19, 2014.*

"SanDisk and Guerilla Union Tap Mobile Phones to Explore New Fan Experience at 'Rock the Bells' Festivals This Summer", http://www.sandisk.com/Corporate/PressRoom/PressReleases/PressRelease.aspx?ID=3877, pp. 1-2, Jul. 9, 2007.

"DVD Play", http://www.dvdplay.com/dvd-rental-machine/kiosk.html, pp. 1, printed on Aug. 23, 2007.

"PCIS Express® Base 2.0 Specification", http://www.pcisig.com/specifications/pciexpress/base2/, pp. 1-2, printed on Sep. 21, 2007.

Ali, R., "DDR2 SDRAM Interfaces for Next-Gen Systems", *Electronic Engineering Times-Asia*, pp. 1-3, Oct. 16-31, 2006.

"DDR2 SDRAM", http://www.en.wikipedia.org/wiki/DDR2_SDRAM, pp. 1-3, Sep. 14, 2007.

"PCI Express", http://en.wikipedia.org/wiki/PCI_Express, pp. 1-7, Sep. 21, 2007.

"Porto Media—At a Glance", http://www.portomedia.com/index.html, pp. 1, printed on Sep. 23, 2007.

"Porto Media—Who We Are", http://www.portomedia.com/who.html, pp. 1, printed on Sep. 23, 2007.

"Porto Media—Our Vision", http://www.portomedia.com/vision.html, pp. 1, printed on Sep. 23, 2007.

"Porto Media—Key Profiles", http://www.portomedi.com/profile.html, pp. 1-5, printed on Sep. 23, 2007.

"Porto Media—What We Do—The Opportunity", http://www.portomedia.com/what.html., pp. 1, printed on Sep. 23, 2007.

"Porto Media—What We Do—The Medium", http://www.portomedia.com/what.html., pp. 1, printed on Sep. 23, 2007.

"Porto Media—What We Do—The Technology", http://www.portomedia.com/what.html., pp. 1, printed on Sep. 23, 2007.

"Porto Media—The Experience", http://www.portomedia.com/experience.html, pp. 1, printed on Sep. 23, 2007.

"Porto Media—Our Partners", http://www:portomedia.com/partners.html., pp. 1, printed on Sep. 23, 2007.

"Porto Media—News and Media", http://www.portomedia.com/news.html, pp. 1-2, printed on Sep. 23, 2007.

"Porto Media—Contact Us", http://www.portomedia.com/contact.html, pp. 1, printed on Sep. 23, 2007.

Wallenstein, A., "Key to Movie Rental: Toa Flash, In a Flash", http://www.hollywoodreporter.com/hr/content_display/features/columns/e3i83cf9e28085a, pp. 1-2, Aug. 29, 2007.

Gupta, S., "Porto Media: Download DVD Quality Movies and Go", http://www.digitalmediathoughts.com/index/php?action=expand.12556, pp. 1-2, Sep. 2, 2007.

"Galway Movie Key to Revolutionise Movie Rental Industry", http://www.galwaynews.ie/1113-galway-movie-key-revolutionise-movie-rental-industry, pp. 1, Aug. 30, 2007.

"Porto Media Changes the Movie Distribution Game With a New Spin on a Proven Customer Experience", http://www-306.ibm.com/software/success/cssdb.nsf/CS/JSTS-6TRSBE?OpenDocument& . . . pp. 1-5, Sep. 25, 2006.

Alfandari, M., "Fast and Secured Distribution of Digital Multimedia Content-Kiosk Movie Distribution System", pp. 1-14, Jul. 2007.

(56) References Cited

OTHER PUBLICATIONS

Naji, P. et al., "A 2556 kb 3.0V ITIMTJ Nonvolatile Magnetoresistive RAM", *Digest of Technical Papers of the 2001 IEEE International Solid-State Circuits Conferenes, ISSCC 2001/Session 7/Technology Directions: Advanced Technologies/7.6*, Feb. 6, 2001, pp. 94-95 (and 404-405 in the ISSCC 2001 Visual Supplement), Feb. 6, 2001.
"Method Combining Once-Writable and Rewritable Information Storage to Support Data Processing," U.S. Appl. No. 11/529,582, filed Sep. 29, 2006, inventors: Neil A. Dunlop and Kevin P. Kealy.
"Matsushita Electric, SanDisk and Toshiba Agree to Join Forces to Develop and Promote Next Generation Secure Memory Card," 4 pages, 2001.
Menezes et al., "Handbook of Applied Cryptography," pp. 403-405, 506-515, 570, 1997.
Schneier et al, "Applied Cryptography," pp. 574-577, 1996.
Search Report and Written Opinion for PCT/US2007/067910, 12 pages, Feb. 29, 2008.
Becker et al., "A study of the DVD content scrambling system (CSS) algorithm," Signal Processing and Information Technology, 2004, Proceedings of the Fourth IEEE International Symposium on Rome, Italy, Dec. 18-21, 2004, pp. 353-356.
U.S. Appl. No. 11/382,184, filed May 8, 2006, Shen, et al.
U.S. Appl. No. 11/532,420, filed Sep. 15, 2006, Shen, et al.
U.S. Appl. No. 11/532,431, filed Sep. 15, 2006, Shen, et al.
Office Action for U.S. Appl. No. 11/382,184, 15 pages, mailed Jun. 10, 2008.
Office Action for U.S. Appl. No. 11/532,431, dated Feb. 26, 2009, 9 pages.
Office Action for U.S. Appl. No. 11/382,184, dated Mar. 5, 2009, 12 pages.
Final Office Action for U.S. Appl. No. 11/382,184, dated Aug. 3, 2009, 11 pages.
Restriction Requirement for U.S. Appl. No. 11/532,420, dated Jun. 22, 2009, 7 pages.
Restriction Requirement for U.S. Appl. No. 11/532,431, dated Nov. 17, 2008, 6 pages.
Final Office Action for U.S. Appl. No. 11/532,431, dated Nov. 12, 2009, 10 pages.
Taiwanese Office Action relating to ROC (Taiwan) Patent Application No. 096116130, dated Aug. 27, 2010, 3 pages.
Office Action for U.S. Appl. No. 11/382,184, dated Oct. 4, 2010, 16 pages.
Office Action for U.S. Appl. No. 11/382,184, 12 pages, Jan. 19, 2010.
Office Action for U.S. Appl. No. 11/382,184, dated Nov. 28, 2012, 9 pages.
Office Action for U.S. Appl. No. 11/532,431, dated Dec. 17, 2012, 8 pages.
Office Action for U.S. Appl. No. 11/382,184, dated Apr. 19, 2012, 9 pages.
Office Action for U.S. Appl. No. 11/532,431, dated May 21, 2013, 7 pages.
Office Action for U.S. Appl. No. 11/382,184, dated Sep. 29, 2011, 16 pages.
Office Action for U.S. Appl. No. 11/382,184, dated Mar. 8, 2011, 17 pages.
Kiran et al., PKI Basics—A Technical Perspective, PKI Forum, Nov. 2002, pp. 1-15.
U.S. Appl. No. 11/382,184, May 8, 2006, Shen et al.
U.S. Appl. No. 11/532,420, Sep. 15, 2006, Shen et al.
U.S. Appl. No. 11/532,431, Sep. 15, 2006, Shen et al.

\* cited by examiner

MEDIA WITH PLUGGABLE CODEC METHODS

CROSS-REFERENCE TO RELATED APPLICATIONS

This application is related to U.S. patent application Ser. No. 11/382,184, entitled, "Media with Pluggable Codec," filed on the same day as the present application; which application is incorporated herein as if fully set forth in its entirety.

BACKGROUND OF THE INVENTION

This invention relates to systems and methods for delivering media content in electronic form. More specifically, this invention relates to delivering media content in a format that allows the content to be accessed in convenient ways. All patents, patent applications and other documents cited in the present application are hereby incorporated by reference for all purposes.

The world of today involves distribution of media content for many different purposes. Typically, media content is sent in the form of a media file containing digital information according to a particular format. Examples of such media files include sound files such as those used for voice communication, digital photographs, movies, movie clips, digital artwork and text files. Media files are not limited to files related to the mass media, but may be generated by individuals or private organizations for other individuals or private organizations without being public.

Various channels are used for delivering such media files from one location to another. The internet is used to deliver various kinds of digital content. In some cases, digital content on the internet is publicly available, in other cases access is limited to particular individuals or entities. Other networks, such as intranets or other private networks are also used to deliver media files. Wireless telephone networks are increasingly used for delivery of media files to provide digital content to users regardless of their location. Broadcast media may also distribute media files to users. Media files may be embodied in physical media and physically transported from one location to another. Thus, Digital Video Disks (DVDs), Compact Disks (CDs) and flash memory cards may be used for delivery of media files.

When a media file is received by a recipient, an application is generally used to access the content of the media file. An application used to render the content of a media file may also be considered a media player application. For example, where an audio file is received, an audio player application is used to play the audio file. An application used to view a digital photograph may be considered a media player application. A media player application generally comprises executable code that provides output to a user interface such as a video display or an audio system. Audio players and other media player applications are found on a range of different hardware platforms including Personal Computers (PCs), cell phones, Personal Digital Assistants (PDAs) and MP3 players.

Generally, media player applications are dedicated to playing a particular type of media file, or a limited range of media file types. In some cases, a Coder/Decoder, or "codec" is used to decode a particular media file so that it can be played by a media player application. Thus, a media player application may use different codecs as decoder modules to play files having different media file types.

FIG. 1 shows a prior art example of a media file 101 that is sent from a sender 103 (such a server attached to a network) to a receiver 105 where it is played by a media player application 107 in receiver 105. Media file 101 is sent over a network 109, such as a LAN or the internet and is received by receiver 105. Media player application 107 to be used to play media file 101 may be identified by receiver 105 from the media file type of media file 101. File type may be indicated by a filename extension, or otherwise. Thus, receiver 105 may recognize that a media file is a photograph according to a jpeg format because it has a .jpg extension. A particular codec may be needed for a media player application to play a particular media file. For example, different codecs may be used by a media player application to display photographs according to bitmap, gif or jpeg formats. If the media file is a jpeg file, a jpeg compatible codec is selected. A codec library containing many codecs may be maintained in a receiver so that many codecs are available to decode files of different types. Thus, receiver 105 contains codec library 111 that contains various codecs to be used by media player application 107.

In some cases, files are received having file types for which no codec is found in the codec library. Without such a codec, a media player application may be unable to play the media file. In some cases, a receiver may be able to access codecs from another location. For example, as shown in FIG. 1, a codec source 113 outside receiver 105, which is linked to receiver 105 by network 109, may contain an appropriate codec. This codec may be downloaded by receiver 105 to codec library 111. It is then used by media player application 107 to play media file 101. However, in some cases, when a suitable codec is not found in a codec library, no suitable codec is found elsewhere either. This may be because no network connection is available when the media file is to be played, or because a suitable codec is not found at any known codec source, or for some other reason. In such cases, the media player application is unable to play the media file.

Therefore, there is a need for a method of delivering media files that allows media files to be played by different media player applications. There is also a need for a format for such delivery so that media files are playable by different media player applications.

SUMMARY OF INVENTION

A container file is used to store a media file and a pluggable codec. The container file is created by a sender. The container file is sent to a receiver, generally in response to a request by the receiver. The receiver includes a media player having an interface according to a standard that allows the pluggable codec to be plugged into the application. Prior to receipt of the container file, the receiver generally does not have a codec capable of plugging into the application to play the media file. However, when the container file is received, the codec is loaded into a codec library so that the application can use it to play the media file. In this way, a container file containing a media file provides the means to play the media file to any application having the appropriate codec interface.

A container file may contain a header that indicates the locations of components within the container file. In this way, a header tells an application the location of a codec and a media file in the container file so that the codec can be loaded into a codec library and the media file can be accessed and played. In some cases, more than one media file and more than one codec may be placed in a single container file.

A standard interface between a codec and a media player application may include a command set. The command set defines commands that the media player application uses to control the codec to play the media file. A media player application having a standard interface may not need to be updated in order to play media files having a new format. Where an appropriate pluggable codec is available for the new format, the original application may continue to be used without updating. This is particularly useful for embedded applications where users generally do not update or replace applications.

Particular examples where container files containing a codec may be used include sending media files to cell phones and set-top boxes. Container files may be contained in removable physical media so that when the physical media are plugged into platforms that lack a codec to access a media file, the codec is simply obtained from the container file. Container files containing codecs may be used to allow VOIP communication between different applications that would otherwise be incompatible.

DETAILED DESCRIPTION OF ILLUSTRATED EMBODIMENTS

According to an embodiment of the present invention, a sender that has a media file creates a container file and places the media file in the container file. In addition, the sender places a pluggable (plug-in) codec (decoding module) in the container file. The codec is compatible with the media file and is designed to plug into applications having a standard interface. The container file containing the media file and codec are sent from the sender to the receiver. The container file is generally sent in response to a request from the receiver for the media file. The receiver has a media player application that has a standard interface. However, the application does not include a codec compatible with the media file prior to receiving the container file from the sender. After the container file is received, the codec from the container file is loaded into the codec library of the application. As a result of loading the codec into the codec library, the application becomes capable of playing the media file. The application then plays the media file to provide an output.

Figure 1:
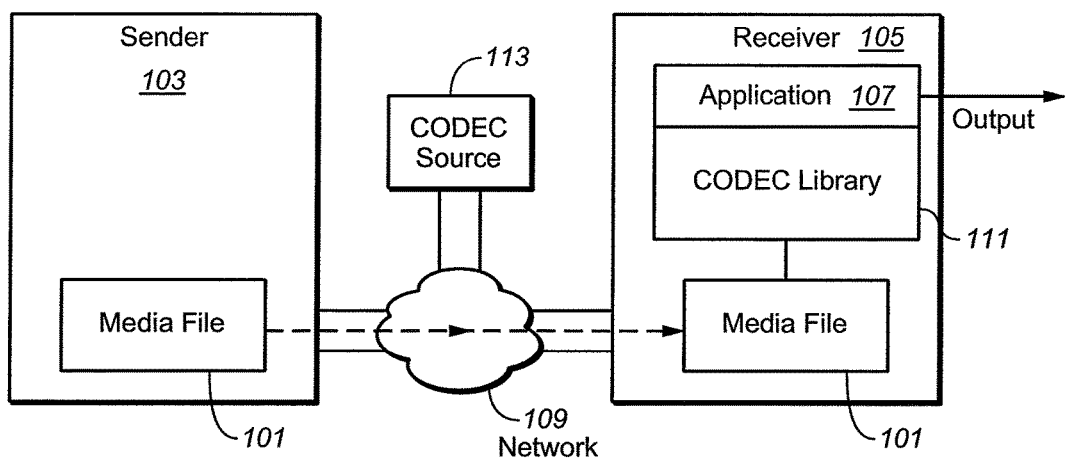
FIG. 1 shows a media file being sent to a receiver where a media player application plays the media file according to a prior art example.
Figure 2:
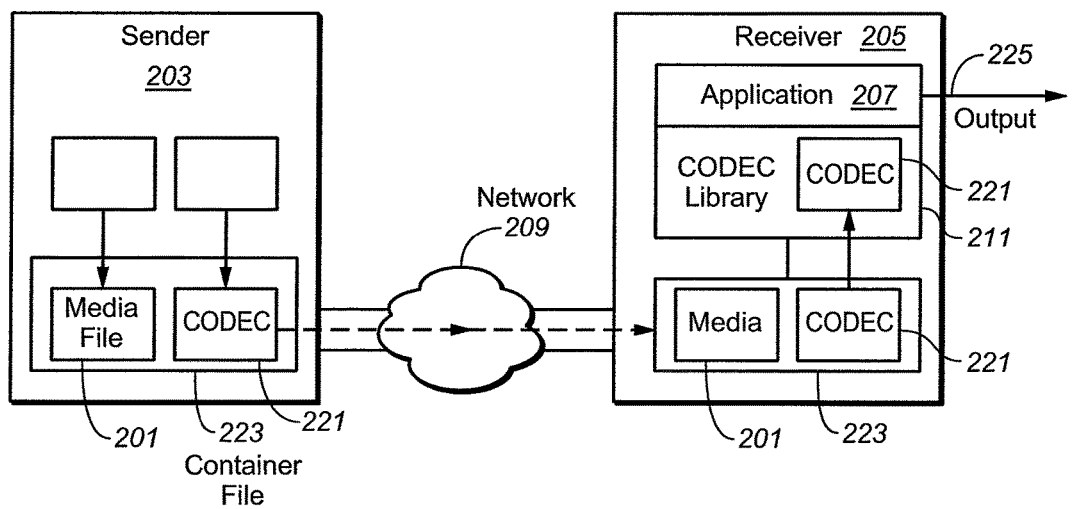
FIG. 2 shows a media file and a codec loaded into a container file by a sender, the container file sent to a receiver where the codec is used to play the media file.

FIG. 2 shows a sender 203 loading a media file 201 and codec 221 into a container file 223 according to one example. In other examples more than one media file and more than one codec may be loaded into the same container file. For example, an audio file and an audio codec and a video file and a video codec may be loaded in a single container file. A container file may also contain other components. In most cases, a header is included in the container file to provide certain information about the contents of the container file. Container file 223 is sent to a receiver 205 via a network 209. Container file 223 is generally sent in response to a request from receiver 205. The request may be sent over network 209, or in some other way. Container file 223 may be created in response to receipt of such a request, or may be created prior to such a request. In some cases, instead of being created by sender 203, container file 223 is created elsewhere and sent to sender 203. Prior to receipt of container file 223, application 207 in receiver 205 does not have the ability to play media file 201. This is because application 207 lacks an appropriate codec to decode media file 201. When container file 223 is received by receiver 205, codec 221 is identified (using a header, or otherwise) and is loaded into a codec library 211. Using codec 221 in codec library 211, application 207 is then able to play media file 201 to provide an output 225.

In some cases a codec library is empty prior to receipt of a codec in a container file, while in other cases, a codec library may contain a range of codecs prior to receipt of a container file. In some cases, a codec is maintained in a codec library after it is used so that it is available for subsequent use. However, in many cases it is desirable to reduce the resources used by the codec library by maintaining a particular codec only when it is needed. Thus, once the media file has been played once, the codec for that media file may be erased. Alternatively, a limited number of codecs may be cached. For mobile devices, it may be particularly desirable to limit the size of the codec library by only keeping a codec for a limited time. If, for any reason, a media player application is unable to use the pluggable codec from a container file, the codec library may be searched to see if another suitable codec is stored in the codec library. If such a codec is found, it may be used instead of the pluggable codec from the container file and the media file may be played using the codec from the codec library.

Playing a media file may take a number of different forms depending on the nature of the media and the nature of the receiver. In many examples, a receiver consists of hardware that has a limited number of embedded applications. For example, cell phones and PDAs may have applications that are part of the firmware of the device and are designed to provide particular outputs, such as audio or video output from the device. In other cases, the output from a media player application may be provided to another application on the same device.

Figure 3A:
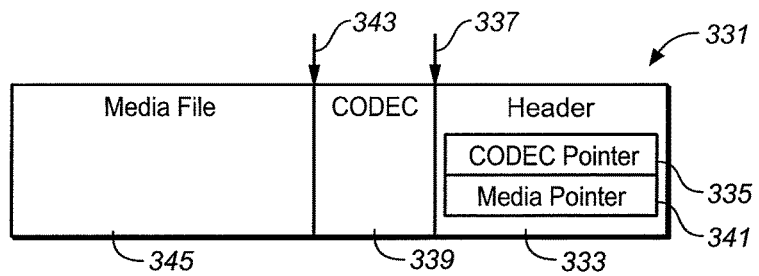
FIG. 3A shows a container file including a header portion, a codec portion and a media portion.

FIG. 3A shows an example of a container file 331 according to an embodiment of the present invention. Container file 331 contains a header portion 333 that includes information about container file 331. Header portion 333 includes a codec pointer 335 that indicates a location 337 within a container file 331 where a codec portion (codec) 339 begins and a media pointer 341 that indicates a location 343 within container file 331 where a media portion (media file) 345 begins. Other information may also be included in header portion 333. Various kinds of metadata related to codec 339 or media file 345 may be provided in header portion 333. For example, the size of codec 339 and hence the amount of memory required to store codec 339 may be indicated. Alternatively, such metadata may be in one or more separate files in container file 331. Header portion 333 may indicate the type of application needed to play media file 345. Hardware requirements may be provided in header portion 333, including the minimum amount of Random Access Memory (RAM) needed. A header portion is generally received by a receiver before other components of a container file. So, based on the contents of a header portion, a receiver may determine whether to continue receiving the container file, or to interrupt transfer of the container file because of problems in playing the media file. A codec portion is generally received after a header portion. Codec 339 may be loaded into a codec library where it is accessed by an application. Codec 339 is generally loaded into RAM for use, though it may be stored elsewhere until it is needed by the application. Thus, a codec library may include a portion of RAM where a codec is loaded for use and, in some cases, a codec library additionally includes a portion of nonvolatile memory where a codec may be stored for an extended period. Media portion 345 is received and may be played using codec 339. In some cases, because codec 339 is already loaded, media portion 345 may begin playing before the entire media portion 345 has been received. In other cases, the entire media portion 345 is received before playing begins.

Figure 3B:
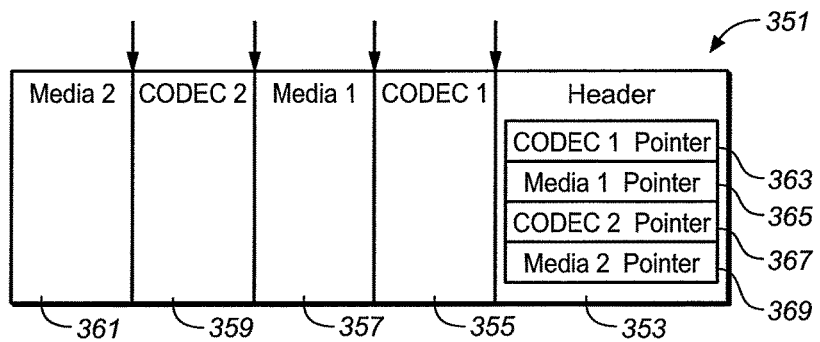
FIG. 3B shows a container file including a header portion, a first codec portion, a first media portion, a second codec portion and a second media portion.

FIG. 3B shows another example of a container file 351 according to an embodiment of the present invention. Container file 351 contains a header 353, a first codec 355, a first media file 357, a second codec 359 and a second media file 361. Header 353 contains a pointer 363 to the first codec 355, a pointer 365 to the first media 357, a pointer 367 to second codec 359 and a pointer 369 to second media file 361. Header 353 may also contain additional information regarding hardware requirements, software requirements and metadata for contents of the container. Here, first codec 355 is used to play first media file 357 and second codec 359 is used to play second media file 361. However, in other examples, a single codec may be used to play two or more media files in the same container file where the media files are of the same type. In other examples, a single container file may contain two or more pluggable codecs to decode a single media file when plugged into different media player applications. Thus, a first pluggable codec may be compatible with a first media player application (using a first interface) while a second pluggable codec may be compatible with a second media player application (using a second interface). By putting both codecs in a container file with a media file, the media file can be played by media player applications having either the first interface or the second interface when they receive the container file.

Figure 3C:
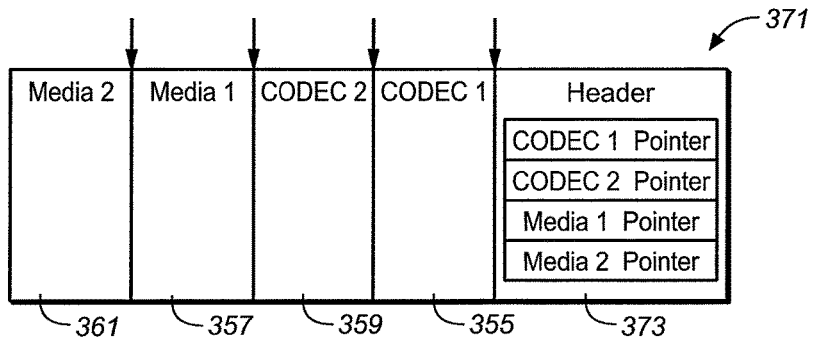
FIG. 3C shows an alternative arrangement of components in a container file.

FIG. 3C shows an alternative arrangement of components in a container file 371 that contains codecs 355, 359 and media files 357, 361. In this example, codecs 355, 359 are located so that they are both received first (after header 373). Thus, media player applications may have both codecs 355, 359 in a codec library when media file 357 and media file 361 are received and can begin playing them when they are received. This may be particularly useful where media file 357 and media file 361 are to be played together. For example, a container file with TV content may include separate audio and video files with separate audio and video codecs (e.g. MP3 or AC3 audio and MPEG4 video). By placing both codecs 355, 359 ahead of media files 357, 361, codecs 355, 359 are already loaded and ready to use when media files 357, 361 are received. Pointers are provided in header portion 373 indicating the locations of components in container file 371 as before.

Figure 3D:
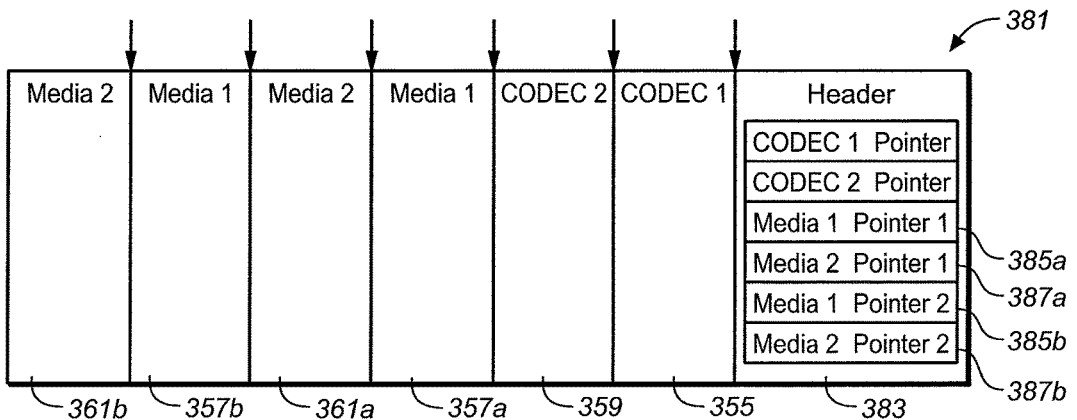
FIG. 3D shows another arrangement of components in a container file with media files interleaved.

FIG. 3D shows another arrangement of components in a container file 381. As in FIG. 3C, first codec 355 and second codec 359 are located immediately after a header 383. After codecs 355 and 359 comes a first portion 357a of media file 357, then a first portion 361a of media file 361, then a second portion 357b of media file 357 and finally a second portion 361b of media file 361. Thus, each media file 357, 361 is broken into two portions 357a, 357b and 361a, 361b in the present example, and these portions are interleaved. Header 383 contains pointers 385a and 385b to portions 357a and 357b respectively of media file 357. Header 383 also contains pointers 387a and 387b to portions 361a and 361b respectively of media file 361. Using these pointers a media player application can determine where a particular file portion is located. By interleaving media files in this way, both files 357, 361 may be played as they are received. Thus, for example, when media portion 357a and media portion 361a are received, a media player application may begin playing media file 357 and media file 361 even though not all of media file 357 or media file 361 has been received. The entire files may be played without interruption where sufficient buffering is provided. Thus, as first portion 357a of media file 357 and first portion 361a of media portion 361 are being played, second portion 357b of media file 357 and second portion 361b of media file 361 are received and buffered and are ready to play by the time first portions 357a, 361a finish playing. While the example of FIG. 3D shows media files 357, 361, each broken into two portions, in some cases more than two portions are used. In some cases, files are broken down into many small portions that are interleaved in a container file to allow files to be played concurrently.

In another embodiment a container file is stored in a removable physical storage medium that is used to transport the container file so that it can be played on one or more platforms. Typically, such physical storage media conform to standards allowing compatibility with a range of platforms. Thus, for example, a Digital Video Disk (DVD) may conform to a standard allowing it to be played on a variety of DVD players. Examples of physical storage media that may be used to store container files include DVDs, CDs and flash memory cards. When a physical storage medium is connected to a device containing a media player application, the device accesses the container file in the physical storage medium. The codec in the container file is loaded into the codec library of the media player application. The media player application becomes capable of playing the media file in the container file as a result. The media file is then played by the media player application.

Figure 4:
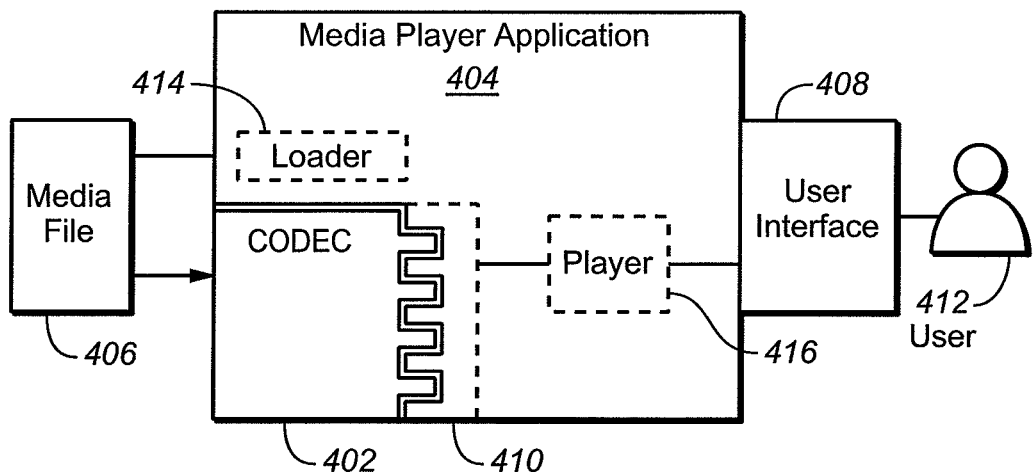
FIG. 4 shows a pluggable codec that connects to an application according to a standard interface that includes a predefined command set, the application using the codec to access a media file and provide media content from the media to a user.

FIG. 4 illustrates how a pluggable codec 402 and a media player application 404 operate to play a media file 406. Pluggable codec 402 is illustrated plugging into application 404. In software terms, this means that there is a predefined set of commands that are used by application 404 to control pluggable codec 402. This set of commands defines a standard interface (Application Program Interface, or API)

that allows application 404 to use a variety of different codecs that are compatible with the interface. In response to commands from application 404, pluggable codec 402 performs particular functions and returns data to application 404. Examples of commands that may be defined by a standard interface include: PLAY, PAUSE, STOP, FAST FWD, REWIND, NEXT CHAPTER, PREVIOUS CHAPTER. An application that communicates with a pluggable codec according to a standard interface may be used with a variety of codecs, even codecs that were not available when the application was developed. In this way, when new formats are developed for media files, player applications are not necessarily obsolete. A user may not have to do any reconfiguration. A codec for the new media format is sent with a media file according to the new media format so that updating is automatic. This means that even embedded applications that are not easily updated can be used with newer media file types. FIG. 4 shows media player application 404 in communication with a user interface 408. In some devices, such as MP3 players, a media player application may be considered to include all functions of the MP3 player including the user interface. In other devices, the application communicates with the user over a user interface that is considered separate from the application. The user interface may include a sound card and speakers or headphones, a video display, keyboard, mouse or any other hardware components for communication with a user 412 in addition to software used to operate such hardware.

Security features may be implemented to ensure that a codec is safe to use before it is loaded and used to play a media file. A digital signature may be provided with the codec to indicate that it was created by an authorized codec provider. Authorized codec providers may use a private key for such signature, where the public key is available to applications to verify a codec before use. Similarly, media files may be checked using a digital signature. Encryption may also be sued to ensure security.

In some cases, media files are compressed to more efficiently store and transport them. Where a media file is compressed, a pluggable codec stored in a container file with the media file may be used by a preinstalled application on a receiver device to decompress, and thus decode the media file. A pluggable codec used for decompression is generally not capable of decompressing the media file on its own. Because it is a pluggable codec it requires the preinstalled application on the receiver and is only functional when it is plugged into such an application. If such an application is not present on the receiver, the codec is generally not able to decompress the media file.

A media player application may include subcomponents to allow operation with a container file. Media player application 404 includes a codec interface portion 410 that interfaces with codec 402 according to an interface standard that includes a predetermined command set. A loader portion 414 of media player application 404 loads codec 402 from a container file into the codec library of application 404. A player portion 416 of media player application 404 receives an input from pluggable codec 402 through interface portion 410 and provides an output to user interface 408 or, in some cases, the player portion of the media player application includes interface 408.

Figure 5A:
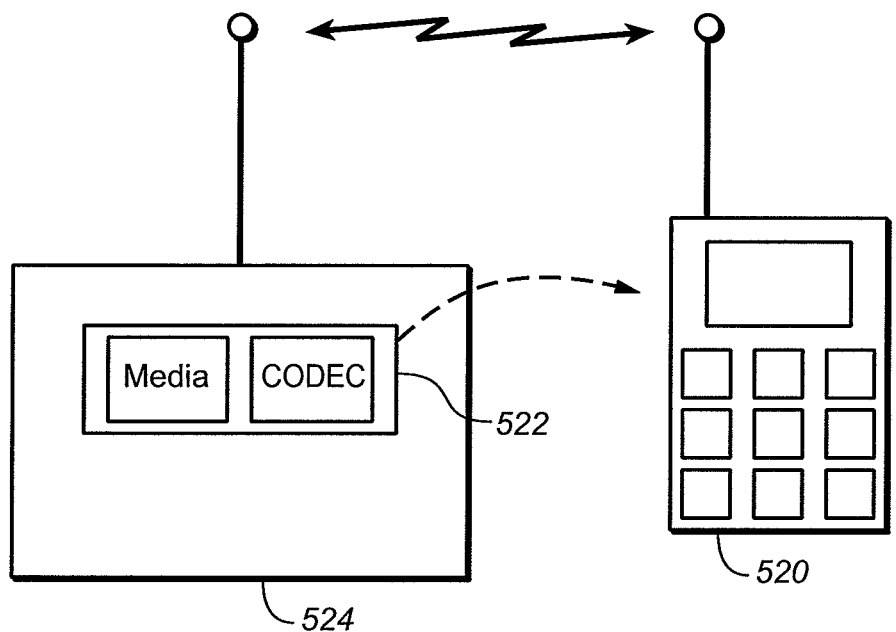
FIG. 5A shows an example of a container file sent to a cell phone over a wireless network.

FIG. 5A shows an embodiment of the present invention involving a cell phone 520 as a receiver of a container file 522. Container file 522 is created by a sender 524, which may be another cell phone or may be a PC, server or other device that is in communication with a cell phone network. A cell phone user requests a particular media file. The request may include an indication that cell phone 520 is compatible with a container file and an application is present in cell phone 520 that has a standard interface for a pluggable codec. For example, the user may select a particular music track or a TV show from a menu. The request is received by sender 524, which then sends container file 522 over a wireless network to cell phone 520. Cell phones are generally limited in their capabilities, so that maintaining a large number of codecs in a codec library in a cell phone is generally prohibitive. A media player application is generally embedded in a cell phone or similar device. So, frequently updating such an application for different media file formats is not practical. Therefore, in some cases, a codec library is maintained that does not contain any codec until a particular container file is received. The codec from the container file is then loaded into the codec library to play the media file. The codec may be used for a one-time playing of the file, or may be maintained in memory until another container file is received, at which time the codec is replaced by a new codec from the newly received container file. Thus, one codec is kept in the codec library at any time. Alternatively, a limited number of codecs may be stored, with older codecs deleted to make room for newly received codecs. Thus, a number of more recently received codecs may be stored in a codec library.

Figure 5B:
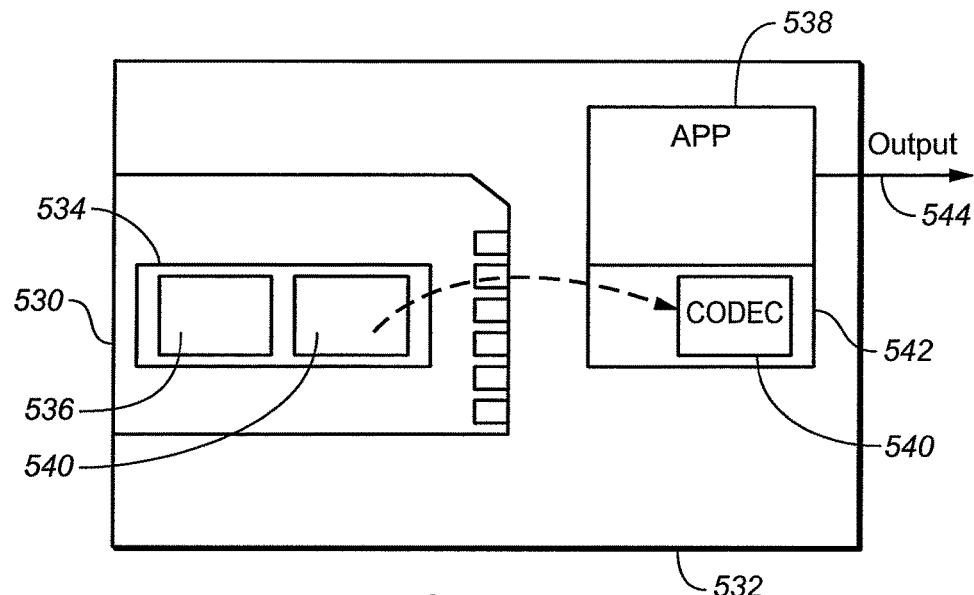
FIG. 5B shows an example of a container file stored in a flash memory card that is plugged into a device containing an application that uses the codec in the container file to play the media file in the container file.

FIG. 5B shows another embodiment of the present invention involving a flash memory card 530 as a sender and an MP3 player 532 as a receiver. Examples of flash memory cards include CompactFlash™ (CF) cards, MultiMedia cards (MMC), Secure Digital (SD) cards, Smart Media cards, personnel tags (P-Tag) and Memory Stick cards. Flash memory card 530 stores a container file 534 in nonvolatile memory. Flash memory card 530 may be inserted into a variety of devices, including MP3 players, such as MP3 player 532. When a user wants to play a portion of music that is stored in a media file 536 in container file 534, an application 538 on MP3 player 532 sends a command to flash memory card 530. Codec 540 from container file 534 is then loaded into a codec library 542 of application 538. In this case application 538 may be the only application in MP3 player 532 because MP3 player 532 is dedicated to playing MP3 files. In other cases, multiple players may be provided in the same device. Applications may be provided in the form of embedded applications that are not configurable by the user. Such Applications are generally loaded as firmware at the factory and are not subsequently modified by the user. Codec 540 is used by application 538 to play media file 536 containing the portion of music requested by the user. Thus, an output 544 in this case is an audio output requested by the user. In some examples, a codec is maintained in the codec library of the application only while it is in use and is not stored there for an extended period. In such examples, the codec library may consist of volatile memory (RAM) only. Thus, when MP3 player 532 is turned off, codec 540 may be lost from RAM. The codec may then be reloaded into RAM from memory card 530 when it is next needed. In this way, few resources are required in MP3 player 532 to provide a correct codec for application 538. A single card may contain many container files, with each container file containing one or more codecs. No particular physical arrangement of files within a physical memory array is required, and a container file is not necessarily stored in a physically contiguous manner. A container file is a logical unit and does not necessarily correspond to any physical unit.

While the example of FIG. 5B refers to a flash memory card inserted into an MP3 player, the principles illustrated in this example may be applied to any physical medium (including removable media) that is connected to hardware that includes a media player application having the appropriate interface. For example, a DVD, CD or removable hard drive may be used to store container files that are then played by a media player application that uses the codec from the container file. As with container files delivered over a network, container files delivered in a physical medium may include an appropriate codec that allows an application to play the media file contained in the container file even where the application does not previously have an appropriate codec.

Figure 5C:
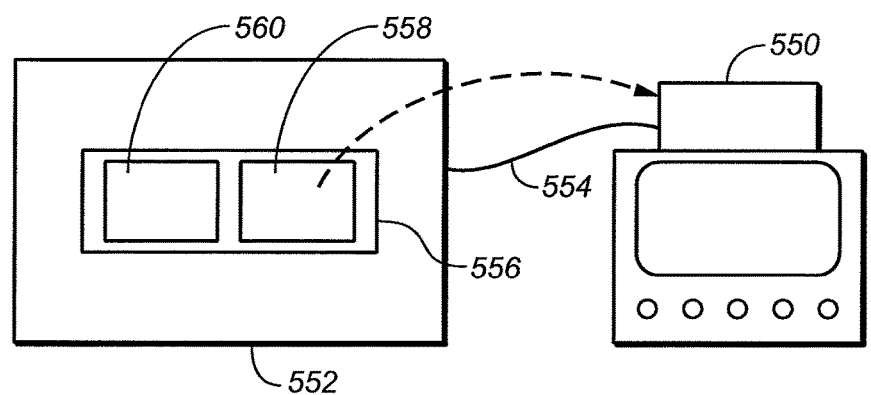
FIG. 5C shows an example of a container file sent to a set-top box that uses the codec in the container file to decode the media file and provide TV content.

FIG. 5C shows another embodiment of the present invention involving a set-top box 550 as a receiver. Set-top box 550 is shown being connected to a sender 552 by a cable 554, in other examples, a set-top box may be connected to a sender via satellite or in some other manner. A sender may be any device that provides TV content. A container file 556 is created by sender 552 and is sent to set-top box 550 in response to a request from set-top box 550. The request may be entered by a user, or may be based on some predefined instructions entered in the set-top box (for example, to download a particular TV show when it becomes available). Container file 556 is sent to set-top box 550 where an embedded application uses a codec 558 in container file 556 to play a media file 560.

In another embodiment, a container file may be sent from a first PC to a second PC as part of an initialization procedure for a Voice over Internet Protocol (VOIP) telephone exchange. Several prior art VOIP applications allow users to make telephone calls over the internet. However, users are generally limited to making telephone calls with other users that have the same VOIP application running on their PC. Where a VOIP application on a receiver's PC has a standard interface, a container file may be sent by a sender as part of initializing a telephone call. The container contains an appropriate pluggable codec that plugs into the VOIP application and allows the receiver to receive media files (of voice data from the sender in this case) and provide an output that reproduces the sender's voice. A codec may also be sent by the sender that allows the receiver to encode the receiver's voice input for storage in a media file that is sent to the sender. In this way, an exchange of voice data occurs using a coding/decoding standard that is established by the sender when the call is initiated. Such a container file may also be used to initiate conference calls with multiple participants so that each participant obtains the necessary codec.

While the invention has been described above by reference to various embodiments, it will be understood that changes and modifications may be made without departing from the scope of the invention, which is to be defined only by the appended claims and their equivalents.

The invention claimed is:

1. A method of transferring a media file from a first device to a second device, the method comprising:
   creating a container file in the first device;
   placing the media file in the container file in the first device;
   placing a pluggable codec in the container file in the first device; and
   sending the container file from the first device to the second device in response to a request from the second device, the second device having a media player application, wherein the media player application does not have a codec to decode and play the media file prior to receiving the container file from the first device, and
   wherein the pluggable codec contains executable code to enable the media player application to decode and play the media file;
   wherein the media player application uses a predefined set of commands to control the pluggable codec, and wherein the predefined set of commands defines a standard Application Program Interface that allows the media player application to use a variety of different codecs that are compatible with the Application Program Interface.

2. The method of claim 1 wherein the media file is in a first format in the container file and the pluggable codec converts the media file from the first format to a second format.

3. The method of claim 2 wherein the media file in the first format is uncompressed.

4. The method of claim 1 wherein the container file contains a header that indicates a location within the container file of the pluggable codec and a location within the container file of the media file.

5. The method of claim 1 wherein the media player application comprises firmware that is embedded in the second device.

6. The method of claim 1 wherein the container file is sent from the first device to the second device over an internet.

7. The method of claim 1 wherein the container file is sent from the first device to the second device over a wireless network.

8. The method of claim 1 further comprising placing at least one additional media file and at least one additional codec in the container file in the first device.

9. The method of claim 1 wherein the first device is a removable medium and the second device is a host system.

10. The method of claim 1, wherein the predefined set of commands comprises one or more of the following commands: play, pause, stop, fast forward, rewind, next chapter, and previous chapter.

11. A method of providing media content in an accessible format, the method comprising:
    creating a container file in a removable medium;
    placing a media file in the container file, the media file containing media content according to a first format; and
    placing a pluggable codec in the container file, the pluggable codec containing executable code to convert the media content according to the first format into a second format when the pluggable codec is connected to a media player application, wherein the media player application does not have a codec to decode and play the media content prior to receiving the container file, wherein the media player application uses a predefined set of commands to control the pluggable codec, and wherein the predefined set of commands defines a standard Application Program Interface that allows the media player application to use a variety of different codecs that are compatible with the Application Program Interface.

12. The method of claim 11 further comprising placing a header in the container file.

13. The method of claim 12 wherein the header indicates the locations of the media file and the pluggable codec.

14. The method of claim 11 further comprising connecting the removable medium to a platform containing the media player application, the media player application being operative to use the pluggable codec to convert the media file from the first format to the second format and use data in the second format to provide an output.

15. The method of claim 11 wherein the container file is located in the removable medium.

16. The method of claim 11 further comprising sending the container file, over a network, to a receiver.

17. The method of claim 11, wherein the predefined set of commands comprises one or more of the following commands: play, pause, stop, fast forward, rewind, next chapter, and previous chapter.

18. A method of providing media content over a network, the method comprising:
   creating a container file;
   placing a media file in the container file, the media file containing media content according to a first format;
   placing a pluggable codec in the container file, the pluggable codec containing executable code to convert media content according to the first format into a second format; and
   in response to a request from a device having a media player application, sending the container file to the device, wherein the media player application does not have a codec to decode and play the media content prior to receiving the container file, and wherein the media player application is operative to use the pluggable codec to convert the media file from the first format to the second format;
   wherein the media player application uses a predefined set of commands to control the pluggable codec, and wherein the predefined set of commands defines a standard Application Program Interface that allows the media player application to use a variety of different codecs that are compatible with the Application Program Interface.

19. The method of claim 18 wherein the media player application is embedded in the device.

20. The method of claim 19 wherein the device is a cell phone, a personal digital assistant or an MP3 player.

21. The method of claim 18 wherein the media file is a sound file and the media player application, executing the pluggable codec, provides an audio output.

22. The method of claim 18 wherein the media file is a video file and the media player application, executing the pluggable codec, provides a video output.

23. The method of claim 18, wherein the predefined set of commands comprises one or more of the following commands: play, pause, stop fast forward rewind, next chapter, and previous chapter.

* * * * *